(12) United States Patent
Byren et al.

(10) Patent No.: US 6,765,663 B2
(45) Date of Patent: Jul. 20, 2004

(54) EFFICIENT MULTIPLE EMITTER BORESIGHT REFERENCE SOURCE

(75) Inventors: Robert W. Byren, Hermosa Beach, CA (US); Edward L. Arnn, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/099,706

(22) Filed: Mar. 14, 2002

(65) Prior Publication Data

US 2003/0174315 A1 Sep. 18, 2003

(51) Int. Cl.⁷ .............................. G01B 11/26; G01J 5/02
(52) U.S. Cl. ..................... 356/152.1; 250/342; 356/153
(58) Field of Search .............................. 356/152.1, 153; 250/342

(56) References Cited

U.S. PATENT DOCUMENTS

| | | | |
|---|---|---|---|
| 4,422,758 A | | 12/1983 | Godfrey et al. |
| 4,917,490 A | * | 4/1990 | Schaffer et al. |
| 5,025,149 A | * | 6/1991 | Hatfield, Jr. ................ 250/342 |
| 5,047,638 A | | 9/1991 | Cameron et al. |
| 5,479,025 A | | 12/1995 | Huniu et al. |
| 5,727,010 A | | 3/1998 | Capasso et al. |
| 5,799,026 A | | 8/1998 | Meyer et al. |
| 5,872,626 A | * | 2/1999 | Lipscomb ................ 356/141.3 |
| 5,901,168 A | | 5/1999 | Baillargeon et al. |
| 5,936,989 A | | 8/1999 | Capasso et al. |
| 6,020,955 A | * | 2/2000 | Messina ..................... 356/138 |
| 6,023,482 A | | 2/2000 | Capasso et al. |
| 6,288,381 B1 | * | 9/2001 | Messina .................. 250/201.1 |

OTHER PUBLICATIONS

J. Faist, F. Capasso, D. Sivco, C. Sirtori, A.Hutchinson, A. Cho "Quantum Cascade Laser", Science, vol. 264, Apr. 22, 1994.

* cited by examiner

Primary Examiner—Stephen C. Buczinski
(74) Attorney, Agent, or Firm—John E. Gunther; Colin M. Raufer; Glenn H. Lenzen, Jr.

(57) ABSTRACT

An efficient multi-emitter boresight reference source (12). The efficient reference source (12) includes a first mechanism (182) for transmitting a first portion of electromagnetic energy (184) within a first waveband. A second mechanism (186) transmits a second portion of electromagnetic energy (188) within a second waveband different than the first waveband. A third mechanism (148) for combining the first portion of electromagnetic energy and the second portion of electromagnetic energy to yield a uniform reference beam (28).

42 Claims, 6 Drawing Sheets

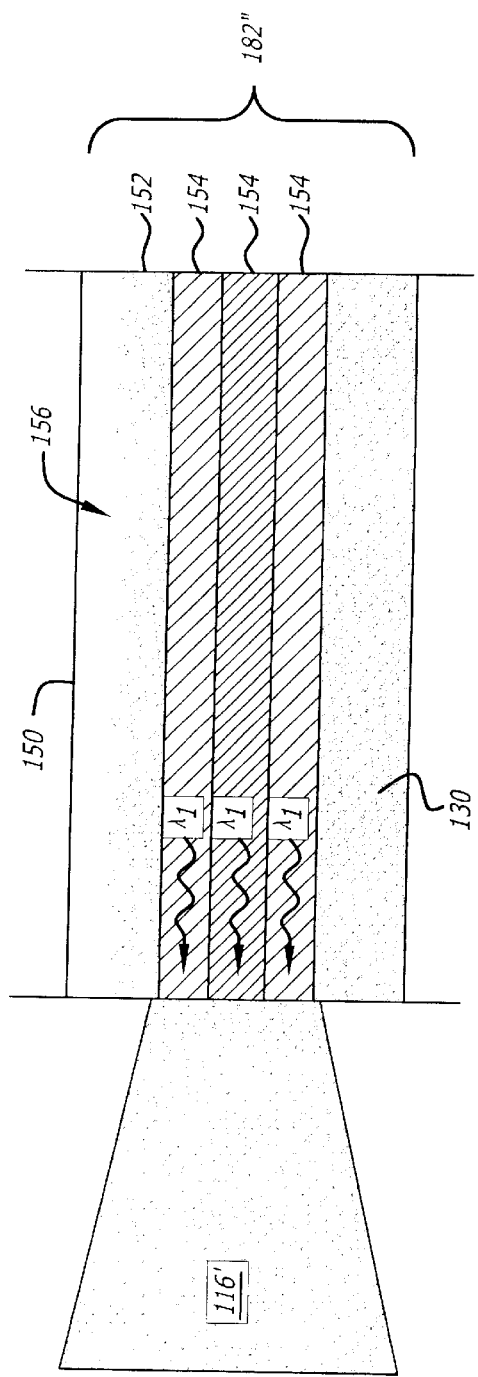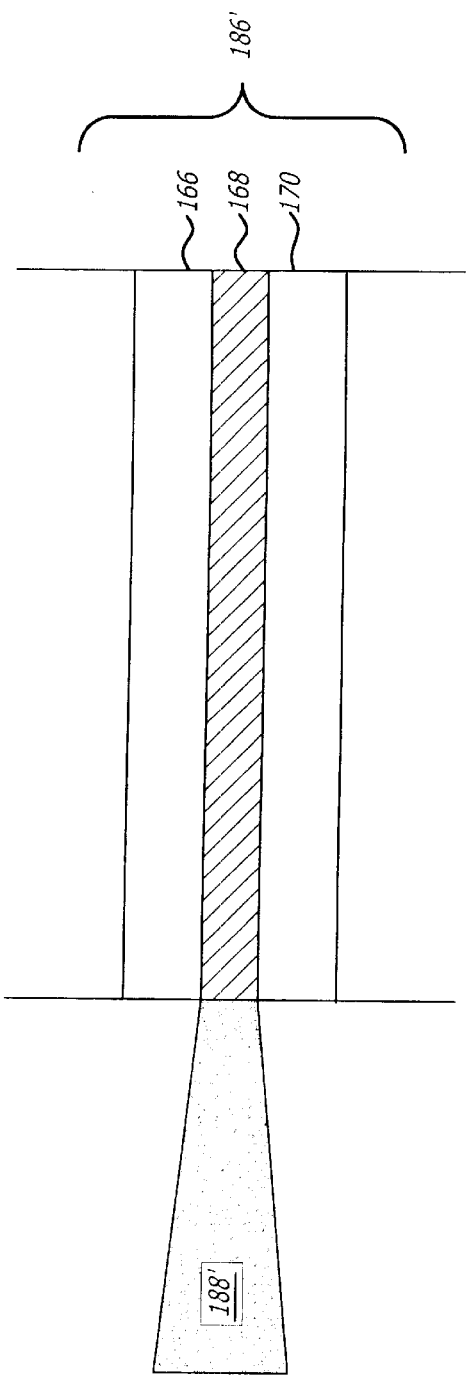

EFFICIENT MULTIPLE EMITTER BORESIGHT REFERENCE SOURCE

BACKGROUND OF THE INVENTION

1. Field of Invention

This invention relates to lasers. Specifically, the present invention relates to bipolar semiconductor laser and quantum cascade laser boresight sources and accompanying systems and methods for aligning and stabilizing components in targeting, imaging, and sensing applications.

2. Description of the Related Art

Boresight sources and accompanying boresight alignment mechanisms are employed in various demanding applications including imaging, chemical analysis, and military targeting, surveillance, and reconnaissance systems. Such systems often require precise alignment of multiple constituent sensor components to ensure accurate handover of sensing function from one sensor to another or to facilitate multi-sensor data integration or fusion.

Precise system component alignment is particularly important in multi-spectral electro-optical systems employing multiple sensors sharing a common aperture. Multi-spectral systems may have different sensor types, such as infrared thermal imagers and visible color television cameras that detect different frequencies of electromagnetic energy.

An exemplary electro-optical system sensor suite includes a laser transceiver, a visible camera, and an infrared imager. The laser transceiver transmits a laser beam toward a scene. The scene reflects the beam, which is detected by the transceiver. The transceiver includes electronics and may include software to measure the round trip delay between transmission and reception of the beam and thereby determine the distance to a specific location within the scene, which may be a target.

The infrared imager detects thermal energy emanating from the scene. Electronics within the infrared imager convert received thermal energy into an image. Similarly, the visible camera receives visible-band electromagnetic energy reflected from the scene and generates a corresponding image. The infrared and visible images may be combined with laser range information to facilitate targeting or sensing. Generally, the center of the received reflected laser beam should coincide with the center or aimpoint of the infrared and visible images for accurate targeting.

The primary non-common path disturbances that cause boresight misalignments between the sensing elements, typically result from shock, vibration, and thermal displacements that warp the structure on which the different sensors are mounted. In some cases, one sensor may be located on a different gimbal with one or more rotational degrees of freedom relative to the other sensor(s). In this case, gimbal bearing runout and gimbal axis non-orthogonality also cause boresight misalignment. Due to their physical size and their complex power/thermal interface requirements, laser transceivers are often located on a different gimbal location than the other sensors. Atmospheric disturbances are common to all sensing elements in a shared-aperture system (ignoring the effects of dispersion in the atmosphere where different wavelengths refract at different angles).

When boresighting a visible or infrared sensor, the sensor is typically aligned with the axis of the range-finding laser beam. A boresight reference source provides a reference beam that is rigidly aligned relative to the range-finding laser and generates a spot on the sensor. The difference between location or the spot on the sensor and the fiducial aimpoint of the sensor represents the amount by which the sensor is misaligned relative to the range-finding laser.

Conventionally, the boresight sources in targeting and sensing systems are blackbody or diode laser sources. A blackbody source emits a beam having a broad spectrum of electromagnetic energy including infrared, visible, and ultraviolet components. The spectral radiance of the blackbody source is determined by temperature of the radiating element, the hotter the element, the more the output spectrum is shifted from the infrared region of the electromagnetic spectrum toward the visible and ultraviolet regions. The reference beam may be physically aligned with the range-finding laser beam and may be directed to create a spot on the detecting surface of an infrared imager, visible camera, and/or other sensor simulating the far-field location of the range-finding laser beam within the scene. The position of each spot corresponds to the aimpoint or preferred center of the infrared and visible camera images, respectively. When the infrared imager or visible camera becomes misaligned, the spot moves on the detecting surface of the infrared imager or visible camera.

To compensate for misalignments when a computer-generated fiducial is used by the system to designate the sensor's aimpoint, software associated with the infrared imager and the visible camera may adjust the stored aimpoint for these sensors to coincide with the energy centers of their respective reference spots or may electronically shift the images that are displayed to an operator. Alternatively, the aimpoint for the infrared imager and visible camera may be adjusted manually via cursor control on a display monitor.

To compensate for misalignments when a particular sensor uses a fixed reticle to designate the aimpoint, software may command a servo mechanism to physically move the sensor line of sight (LOS) such that the reference spot is aligned with reticle aimpoint symbology or cross hairs. Alternatively, the sensor line of sight may be adjusted manually through a control interface, such as a pair of adjustment knobs, which allows the operator to center the reference spot over the reticle aimpoint symbology.

Unfortunately, conventional thermal blackbody boresight sources are often undesirably bulky, relatively dim, highly divergent, not well matched to sensor passbands, require excess operating power, require bulky and expensive collection or projection optics, require undesirably lengthy warm-up times, and emit excess heat. The hot blackbody sources used with visible cameras typically operate between 900 and 1000° C. and must be isolated from critical alignment structures via costly design features to prevent thermal component deformation and associated beam misalignments. The low brightness of blackbody sources and their poor match to specific sensor passbands result in low-contrast spots at the sensor under high ambient lighting conditions, making it difficult or impossible to align the sensor without having to block the scene imagery. The low brightness of blackbody sources may make them unsuitable for use with otherwise desirable high angular resolution sensors, such as low-sensitivity, two-dimensional contiguous photoresistive detectors, called photo-potentiometers or photopots. Photopots are typically less susceptible to problems caused by spot shape nonuniformities than quadrant or quad-cell detectors.

Structural features of the blackbody source may further reduce the source output power. For example, a pinhole may be provided in a light-shield container surrounding the blackbody source to define and limit the size of the spot. The pinhole vignettes much blackbody radiation, making the overall source very inefficient and substantially reducing the optical signal before it reaches the sensors.

The blackbody sources, such as wire-wound ceramic sources as disclosed in U.S. Pat. No. 5,479,025, entitled BORESIGHT THERMAL REFERENCE SOURCE, herein incorporated by reference, produce uncollimated radiation, which must be collimated via expensive optics. To provide adequate signal at the boresight sensors (especially when the primary imaging sensors are themselves used for direct boresighting), a full-aperture optical system may be needed to collect and collimate the blackbody radiation. For example, some sensor suites require a pair of full-aperture reflective off-axis aspheric elements in the collimation system, which are expensive, difficult to align, and may employ expensive full-aperture beamsplitter components.

As an alternative to the blackbody sources, some targeting, imaging, and sensing systems employ one or more semiconductor diode laser boresight sources to align sensors with a laser rangefinder or targeting beam. Although conventional bipolar junction diode lasers (also referred to as pn-junction diode lasers) are often brighter that traditional blackbody sources, they do not require expensive collimating optics, can turn on nearly instantaneously, and do not generate excessive heat, they do have several undesirable characteristics. They emit at only one laser wavelength. Consequently, separate co-boresighted diode laser sources may be required to align different sensors. Furthermore, they are not well matched to the mid-wave and long-wave infrared passbands and may require additional angle sensors or multiple laser diode sources physically boresighted to the infrared imaging sensors for indirect alignment, eliminating the possibility of direct sensor boresighting. The boresight error between the imaging sensor and the additional angle sensor or laser diode source used for indirect alignment cannot be corrected without physical maintenance of the sensor suite. Optically pumped and electrically pumped semiconductor lasers that emit in the mid-infrared region have been reported, however these must be cooled to low temperatures via expensive thermo-electric or cryogenic coolers.

Multiple laser diodes have been integrated on a common structure to increase the source output power. Conventional bipolar diode laser sources have been developed and sold commercially that have two or more diode emitters operating at essentially the same wavelength. However, these emitters operate at similar wavelengths and suffer from similar shortcomings as conventional single-emitter diode boresight sources when used in sensor suites for beam alignment purposes. Furthermore, interference and beating between the operating modes of some multiple-emitter sources can cause spatial and temporal beam nonuniformities, called speckle. Beam nonuniformities are particularly problematic in systems employing quadrant or quad-cell detectors to determine the center of the beam for alignment purposes. Quad-cell detection methods generally determine the centriod of the laser beam energy distribution on the surface of the detector. A non-uniform beam may have an uneven and time-varying energy distribution, yielding an off-center centriod location, thereby causing alignment errors.

Hence, a need exists in the art for an efficient multi-spectral boresight reference source for infrared and visible systems that provides a bright and uniform beam, requires minimal installation space, requires little or no warm-up time, outputs minimal excess heat, can operate at room temperature, is suitable for use with high-angular resolution sensors, and does not require bulky, expensive projection optics. There exists a further need for an efficient sensor suite and accompanying boresighting system that employs the efficient boresight reference source.

SUMMARY OF THE INVENTION

The need in the art is addressed by the efficient boresight reference source of the present invention. In the illustrative embodiment, the inventive reference source is adapted for use in a multi-spectral sensor suite and an accompanying boresighting system for aligning sensors of the sensor suite. The efficient boresight reference source includes a first semiconductor laser emitting structure for transmitting a first portion of electromagnetic energy that coincides with a portion of the passband of a first sensor within the suite. A second emitting structure transmits a second portion of electromagnetic energy that coincides with a portion or the passband of a second sensor within the suite. The first and second portions of electromagnetic energy are sufficiently different in wavelength that there is no substantial coupling between the laser cavities associated with the two emitting structures due to optical feedback from external elements, imperfect isolation of the waveguide-confined cavities or evanescent wave coupling between the isolated laser cavities. An additional mechanism combines the first portion of electromagnetic energy and the second portion of electromagnetic energy to yield a uniform, collimated, co-aligned multi-spectral reference beam.

In a more specific embodiment, the first emitting structure is composed of one or more infrared unipolar semiconductor laser emitters, also referred to as Quantum Cascade Laser (QCL) emitters. The second emitting structure may include a conventional bipolar junction semiconductor diode laser emitter or may also include one or more QCL emitters.

In yet a more specific embodiment, multiple infrared QCL repeat units within the first emitting structure are caused to operate at different wavelengths within the passband of the first infrared imaging sensor to increase the output power and enhance the beam uniformity of the inventive boresight reference source through spatial and temporal interference averaging. Each emitting structure is oriented with respect to the others to cause automatic combining of the respective portions of electromagnetic energy.

QCL repeat units with different superlattice compositions and/or quantum well thickness or identical repeat units operating at different temperatures are employed to generate different center wavelengths within each waveband. Different QCL repeat unit temperatures may be produced by cooling only one planar surface of the QCL device, thereby creating a thermal gradient between emitting structures. The different emitting structure temperatures produce changes in the refractive index and physical length of the laser cavity, resulting in a change in beam path length within the respective laser cavities, which monotonically shifts the wavelengths of the resonant modes from one QCL repeat unit to the next.

In an alternative embodiment, the multiple QCL emitting structures (emitters) include one or more distributed feedback gratings that define the length of the resonator cavity within each laser emitter so that lasing within all laser emitters occurs on a single longitudinal mode and at a single phase. This embodiment also produces a uniform coherent beam of electromagnetic energy that is free of interference effects.

The novel design of the present invention is facilitated by the use of plural emitting structures. Use of multiple emitting structures helps provide high source power and uniformity and enables transmission in infrared and optical frequency bands, which facilitates automatic and simultaneous boresighting of sensors with different passbands. Furthermore, the use of a QCL with multiple QCL emitters is energy efficient.

BRIEF DESCRIPTION OF THE DRAWINGS

FIG. 7 is a diagram of a second alternative embodiment of either the first or second emitting structure portions of the multi-source of FIG. 1, in which the emitting structure is composed of multiple QCL repeat units wherein the laser cavities share a common distributed feedback diffraction grating cavity reflector.

FIG. 8 is a diagram of an alternative embodiment of the second emitting structure portion of the multi-source of FIG. 1, in which the emitting structure includes a conventional bipolar junction semiconductor diode laser.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
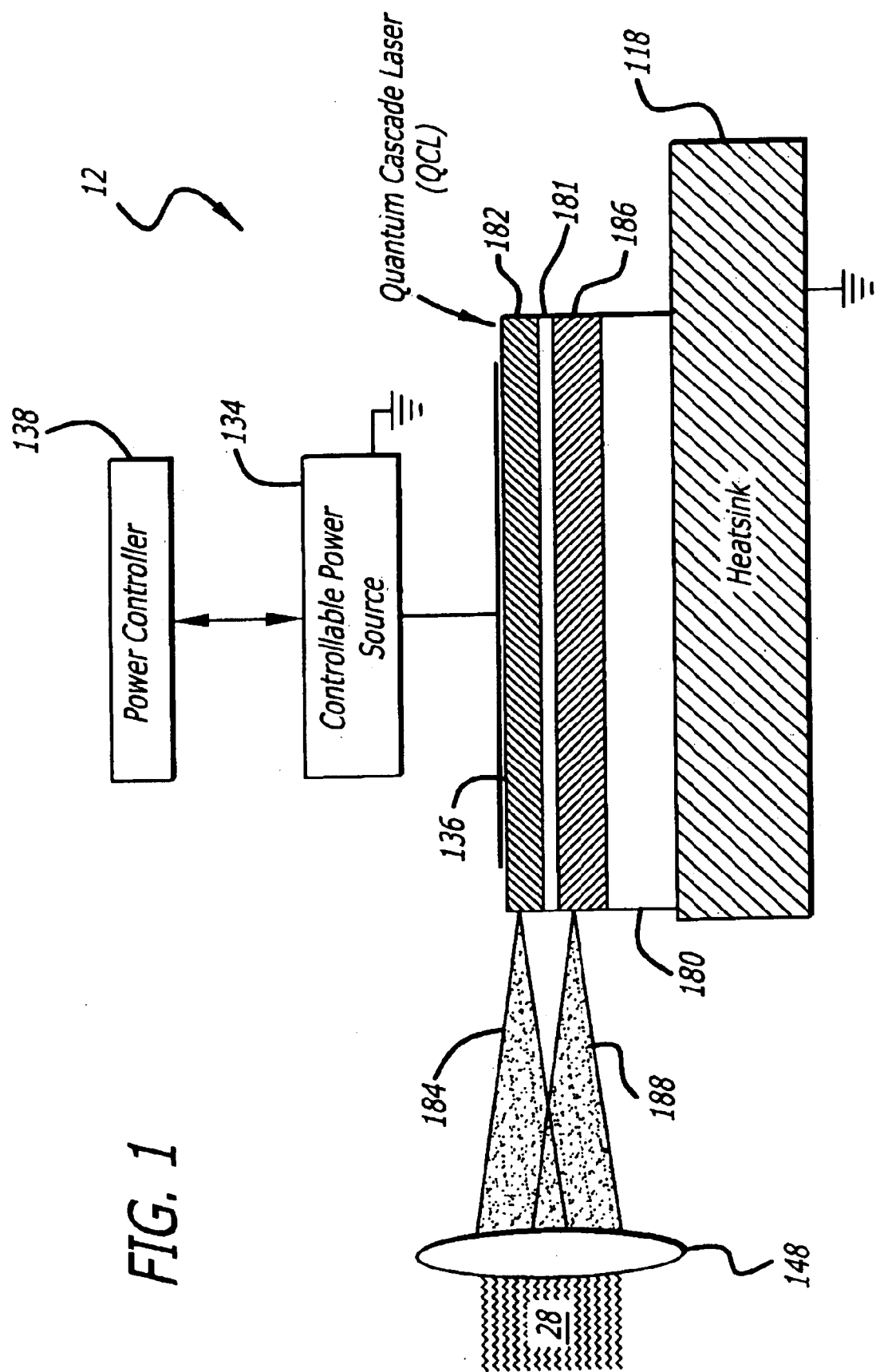
FIG. 1 is a diagram of an efficient multi-spectral boresight reference source (multi-source) employing multiple emitting structures.

FIG. 1 is a diagram of an efficient multi-spectral boresight reference source (multi-source) 12 employing multiple emitting structures 182, 186. The efficient boresight reference source 12 includes a first semiconductor laser emitting structure 182 for transmitting a first portion of electromagnetic energy 184 that coincides with a portion of the passband of a first sensor within a sensor suite as discussed more fully below. A second emitting structure 186 transmits a second portion of electromagnetic energy 188 that coincides with a portion of the passband of a second sensor within the sensor suite as discussed more fully below. The first and second emitting structures 182 and 186, respectively, may include one or more laser emitters (not shown) to generate the first portion 184 and second portion 188 of electromagnetic energy, respectively. The second emitting structure 186 is typically grown via a suitable semiconductor epitaxial growth process, such as molecular beam epitaxy (MBE), which is known in the art, on a suitable conductive semiconductor substrate 180.

The source 12 of FIG. 1 includes at least two emitting structures 182, 186 operating in different spectral bands. For the purposes of the present discussion, an emitting structure may include one or more laser emitters.

A conductive transition layer 181, shown for illustrative purposes, may be grown on the second emitting structure 186 using known semiconductor processes to provide a suitable polarity and lattice constant match between the first and second emitting structures. However, in the preferred embodiment, the conductive transition layer 181 is omitted. Preferably, the polarity and lattice constants for the emitting structures 182, 186 are matched so that no conductive transition layer 181 is required.

The first emitting structure 182 is grown on either the transition layer 181 or directly on the second emitting structure 186 via known processes. A suitable electrical contact 136 is attached to the first emitting structure 182.

The first emitting structure 182 may include a laser emitter based on a conventional bipolar junction semiconductor diode configuration, as discussed more fully below. Alternatively, the first emitting structure 182 may include one or more laser emitters based on a unipolar semiconductor laser configuration, commonly referred to as a quantum cascade laser (QCL), as discussed more fully below. Similarly, the second emitting structure 186 may include a bipolar diode laser emitter or one or more QCL emitters. Hence, the emitting structures 182, 186 within the multi-source 12 may use the same semiconductor laser configuration or different configurations.

The lateral dimension (out of plane in FIG. 1) of the lasing cavities within the emitting structures 182, 186 may be defined by the ridge width of mesa regions fabricated via chemical etching through layers 182, 181, and 186 of the multi-source 12 to the substrate 180 using suitable wet-etch or dry-etch processes known in the art. Other suitable structures, such as buried-cavity, and compatible semiconductor fabrication processes known in the art may also be used to define the lateral geometry of the lasing cavities. The vertical and longitudinal dimensions of the lasing cavities are described in relation to other figures herein.

The first and second portions of electromagnetic energy 184 and 188, respectively, are sufficiently different in wavelength to prevent substantial coupling between the laser cavities associated with the laser emitters of said first and second emitting structures. Beam combining optics 148 combine the first portion of electromagnetic energy 184 and the second portion of electromagnetic energy 188 to yield a uniform, collimated, co-aligned multi-spectral reference beam 28. The beam combining optics 148 may include a simple collimating optic as shown, which may be defocused to minimize the error associated with the small angular offset between the first and second portions of electromagnetic energy 184 and 188, respectively, that results from the spatial offset between the emitting region on the output faces of the emitting structures 182, 186. Additional elements such as aberrators, field lenses, apertures, and/or spatial light integrators (not shown), which are known in the art, may also be included in the beam combining optics 148 to reduce the annular offset between the first and second portions of electromagnetic energy 184 and 188, respectively, in the multi-spectral reference beam 28.

The multi-source 12 includes a controllable power source 134, a controller 138, and an electrical contact 136. In the present specific embodiment, the electrical contact 136 is deposited on a surface of the multi-laner semiconductor structure, which is mounted on the heatsink 118. The polarity of the controllable power source 134 is selected to be consistent with the polarity of the laser emitters 182, 186. For example, when a bipolar junction semiconductor diode laser emitter is used, the polarity of the controllable power source 134 is such that the bipolar junction is biased to operate in the forward active region. The controller 138 selectively regulates the power source 134 to provide a desired current waveform through the multi-source semiconductor structure. The semiconductor laser emitters within the emitting structures 182, 186 may be operated in different modes, such as continuous mode or pulsed mode, which is determined via the controller 138, which selectively controls the power source 134 according to the desired operational mode of the multi-source 12. The laser emitters 182, 183 may be designed such that the total voltage applied across the multi-source 12 semiconductior structure is divided between the laser emitters 182, 186 to bias each properly. Alternatively a "tap" contact may be fabricated as part of the semiconductor structure to allow individual biasing of the laser emitters 183, 186 as described by C. Gmachi, et al, Applied Physics Letters, Vol. 79, No. 5, pp 572–574 (2001).

Those skilled in the art will appreciate that additional emitting structures may be added to the planar structure of the multi-source 12 for the purpose of generating additional portions of electromagnetic energy that coincides with respective portions of the passbands of additional sensors within the sensor suite without departing from the spirit or scope of the present invention.

Figure 2:
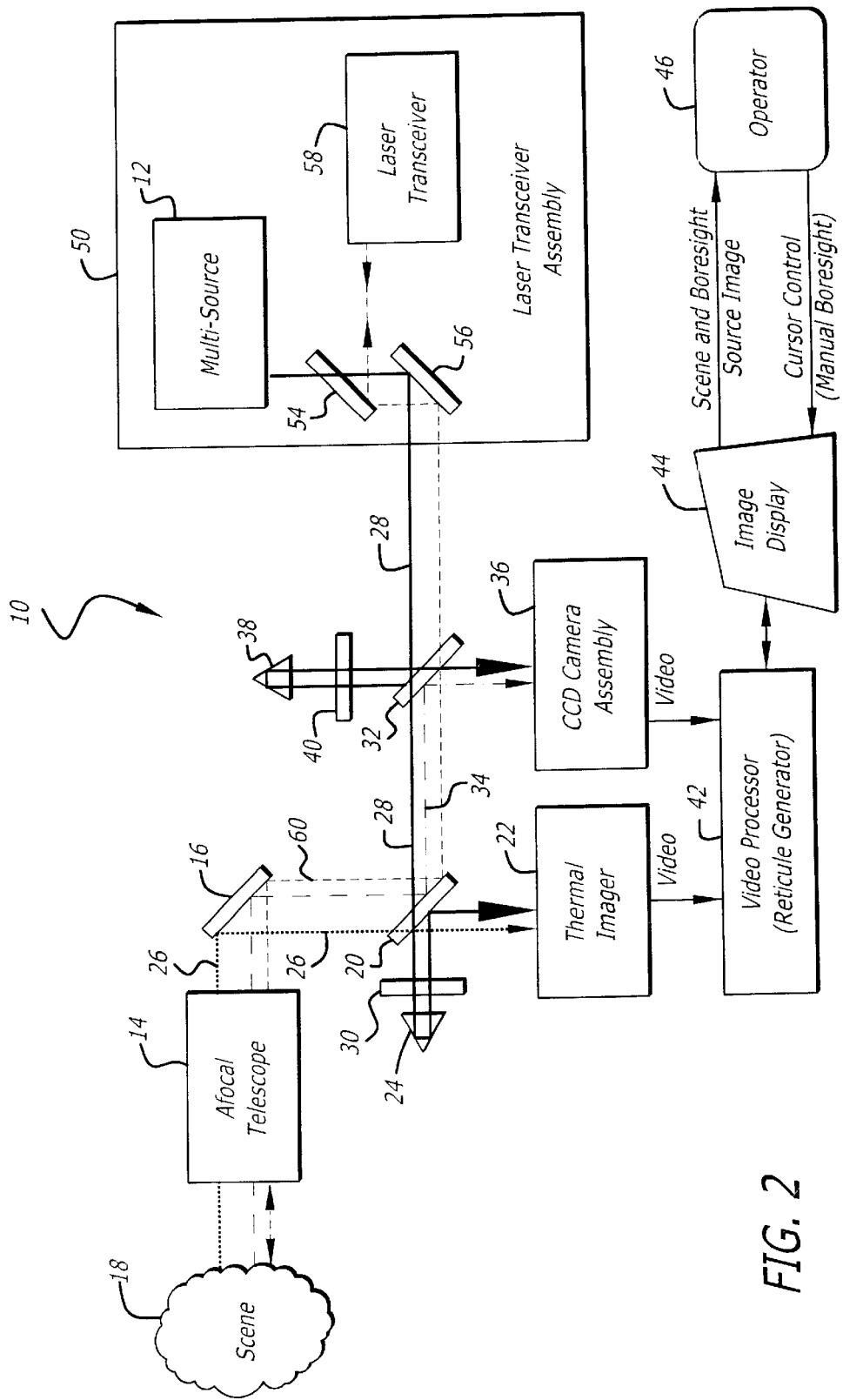
FIG. 2 is a diagram of a first sensor suite employing the multi-source of FIG. 1 as an efficient boresight reference source constructed in accordance with the teachings of the present invention, wherein the boresight source is part of the laser transmitter assembly.

FIG. 2 is a diagram of a first sensor suite 10 constructed in accordance with the teachings of the present invention and employing the multi-source 12 of FIG. 1 as an efficient boresight reference source. The boresight source 11 is part of the laser transmitter assembly 50. For the purposes of the present invention, the term multi-source means a source having multiple emitting structures, which are either adjacent or cascaded and mounted on a common substrate or otherwise arranged to produce a beam containing the components of electromagnetic energy from each emitting structure. For clarity, various well-known components, such as power sources, signal amplifiers, and focusing optics have been omitted from the figures, however those skilled in the art with access to the present teachings will know which components to implement and how to implement them to meet the needs of a given application.

The sensor suite 10 includes an afocal telescope 14 positioned adjacent to a first mirror 16. The first mirror 16 is positioned to direct electromagnetic energy to and from the afocal telescope 14. The electromagnetic energy includes a laser beam 60, thermal (infrared) energy 26, and visible energy 34 received from a scene 18. A first dichroic beam splitter 20 is positioned relative to the first mirror 16 and a thermal imager 22 so that infrared energy 26 received by the dichroic beam splitter 20 from the afocal telescope 14 via the first mirror 16 is directed to the thermal imager 22. The first beam splitter 20 also directs an infrared energy portion of a multi-spectral boresight reference beam (multi-beam) 28 generated by the multi-source 12 to the thermal imager 22 via a first corner reflector 24 and beam attenuator 30. As is known in the art, the thermal imager 22 includes focussing optics and an image forming mechanism (not shown), such as a serial scan mirror with single detector element, a parallel scan mirror with a linear detector array, or a staring focal plane array.

A second beam splitter 32 is positioned relative to the first mirror 16 and first beam splitter 20 so that visible energy 34 emanating from the scene 18 reflects from the second beam splitter 32 onto a Charge-Coupled Device (CCD) array (not shown) of the CCD camera assembly 36 via the first mirror 16 and the first beam splitter 20. The second beam splitter 32 also directs optical energy in the multi-beam 28 to the CCD array of the CCD camera 36 via a second corner reflector 38 and beam attenuator 40.

The thermal imager 22 and the CCD camera assembly 36 communicate with a video processor 42, which is connected to an image display 44, which is accessible to an operator 46. The thermal imager 22 and the CCD camera assembly 36 may be located off of the gimbal (not shown) upon which the afocal telescope 14 and related optics are mounted. The thermal imager 22 is positioned within the system 10 to receive infrared electromagnetic energy from the scene 18 via the afocal telescope 14, the first mirror 16, and the first dichroic beam splitter 20. The thermal imager 22 also receives the multi-beam 28 from the multi-source 12 included in a laser transceiver assembly 50. The laser transceiver assembly 50 also includes a third dichroic beam splitter 54, a second mirror 56 positioned parallel to the third beam splitter 54, and a laser transceiver 58.

In operation, the laser transceiver 58 transmits a near-infrared narrow pulse width laser rangefinder beam 60, which is aimed at the scene 18 via the third dichroic beam splitter 54, the second mirror 56, the second dichroic beam splitter 32, the first dichroic beam splitter 20, the first mirror 16, and the afocal telescope 14. The beam 60 reflects from the scene 18. The reflected beam is returned along the same path as the transmitted beam and detected by the laser receiver (not shown) within the laser transceiver 58. The distance to the target is measured by a range processor (not shown) which measures the time required for the laser pulse to transit the path from the laser transceiver 58 to the target within the scene 18 and back to the laser transceiver 58. The laser transceiver beam 60 is physically boresighted to the multi-beam 28 in a factory alignment process by manually adjusting the angular position (tip/tilt) of the third dichroic beam splitter 54.

The efficient multi-beam 28 passes through collimating optics (not shown) and then through the third beam splitter 54. The multi-beam 28 reflects from the second mirror 56 in a direction parallel and approximately coincident with a laser range finder beam 60. A first portion of the multi-beam 28 containing primarily visible energy then reflects from the second dichroic beam splitter 32 to the second corner reflector 38. The second corner reflector 38 then reflects the first portion of the multi-beam 28 back through the second beam splitter 32 to the CCD camera assembly 36, where it creates a reference spot on the CCD array of the CCD camera assembly 36. The first portion of the multi-beam 28 contains visible energy sufficient for detection by the CCD camera assembly 36.

A second portion of the multi-beam 28 containing primarily infrared energy passes through the second dichroic beam splitter 32 and then through the first beam splitter 20 to the first corner reflector 24. The first corner reflector 24 reflects the second portion of the multi-beam 28 back to the first dichroic beam splitter 20. The second portion (thermal portion) of the multi-beam 28 then reflects from the first beam splitter 20 onto the detecting surface of the thermal imager 22 creating a reference spot on the detecting surface of the thermal imager 22. The second portion of the multi-beam 28 contains infrared electromagnetic energy sufficient for detection by the thermal imager 22.

The thermal imager 22 detects infrared energy emanating from the scene 18 and the video processor 42 aligns the aimpoint position of the thermal imager with the infrared boresight reference spot caused by the efficient boresight multi-source reference beam 28 on the thermal image. This alignment may be continuously and automatically performed via software and/or hardware that is well known in the art and is running on the video processor 42. For example, the software may change the location of the fiducial aimpoint position that is stored in memory to coincide with the location of the reference spot. Similarly, CCD camera assembly 36 detects visible energy from the scene 18, and the video processor 42 aligns the aimpoint position of the CCD camera with the visible boresight reference spot caused by the efficient boresight multi-source reference beam 28 on the CCD visible image.

Alternatively, the aimpoint position for one or both sensors may be aligned manually via cursor control on the display 44 via the operator 46. Typically, this entails using cursor controls to place computer-generated reticle symbology representing the aimpoint position, such as a set of perpendicular cross hairs or an aiming box, over the boresight reference spot. Alternatively, boresighting may be continuously and automatically performed by diverting the sensor line-of-sight servo-mechanically, using the angular separation between the thermal reference spot and the center of the full sensor image as the error signal.

Those skilled in the art will appreciate that reticle generation software and/or hardware running on the video processor 42 may be omitted without departing from the scope and spirit of the present invention. Furthermore, the display 44 and operator 46 may be omitted or replaced with an automatic fire control system, surveillance system, and so on, without departing from the spirit or scope of the present invention.

With reference to FIG. 1, the efficient boresight multi-source 12 of FIG. 1 is optimized for first sensor suite 10 and includes two emitting structures 182, 186. The first emitting structure 182 may be implemented via a unipolar semiconductor laser or QCL with plural laser emitters to provide a high brightness, uniform infrared beam within the thermal imager 22 passband. Each laser emitter includes an active region, wherein the lasing action occurs, and an adjoining "energy relaxation" or carrier injection region. A distributed feedback feature, such as a Bragg grating, may be included to ensure that each laser emitter operates on a single longitudinal mode and in mutual phase, as discussed more fully below.

Alternatively, the QCL emitters may be caused to operate at slightly different wavelengths, thereby spatially and temporally averaging the effects of interference (speckle) in the multi-beam 28 and providing a uniform reference beam for sensor boresighting, as discussed more fully below. The enhanced brightness and uniformity of the boresight multi-source 12 allows for smaller projection optics in the afocal telescope 14 and obviates the need for an expensive full-aperture off-axis reflective telescope.

The second emitting structure 186 may be implemented via a bipolar diode laser with a single conventional emitter to provide a high brightness, uniform visible beam within the CCD camera assembly 36 passband. The short cavity length ensures that the laser operates on a single longitudinal mode with no interference, providing a uniform reference beam. The structure and operation of bipolar semiconductor diode lasers is well known in the art and practiced by many commercial semiconductor component suppliers.

Those skilled in the art will appreciate that the amount of thermal and optical energy contained in the multi-beam 28 is application-specific and may be determined by one skilled in the art to meet the needs of a given application. Unlike conventional blackbody sources, the energy of the boresight reference multi-beam 28 may be easily increased or decreased without costly redesign of the system 10. In previous sensor suites and alignment systems, the boresight multi-source was a blackbody source that was relatively inefficient and provided a relatively dim non-uniform beam.

Figure 3:
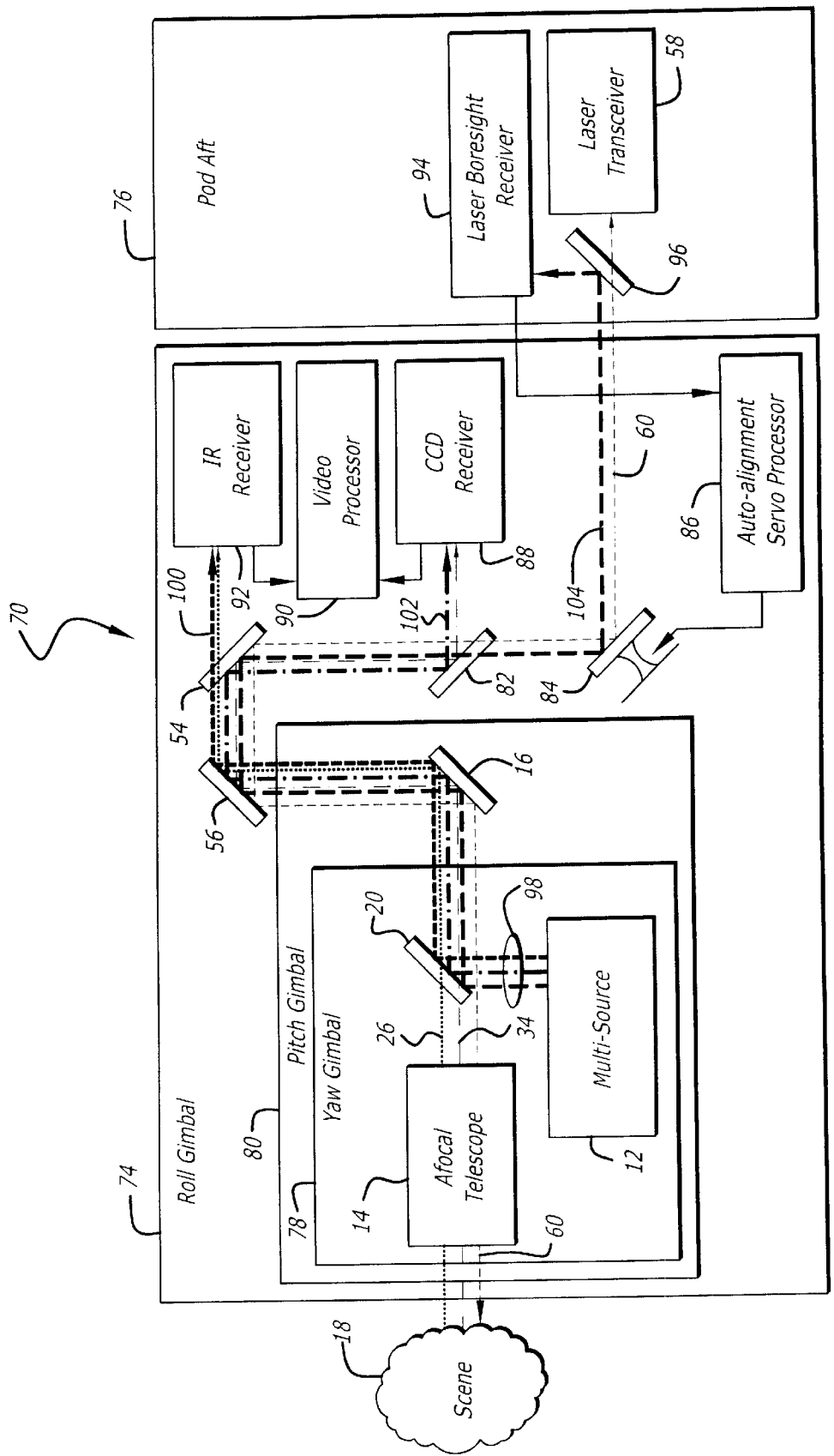
FIG. 3 is a diagram of a second sensor suite employing the multi-source of FIG. 1 and constructed in accordance with the teachings of the present invention, wherein the multi-source is located on the inner gimbal and relayed to sensors located on outer gimbals.

FIG. 3 is a diagram of a second sensor suite 70 employing the multi-source 12 of FIG. 1 and constructed in accordance with the teachings of the present invention. The multi-source 12 is located on an inner gimbal 78 and relayed to sensors located on an outer roll gimbal 74. The sensor suite 70 is an improvement over an analogous sensor suite disclosed in U.S. Pat. No. 6,020,955, entitled SYSTEM FOR PSEUDO ON-GIMBAL, AUTOMATIC LINE-OF-SIGHT ALIGNMENT AND STABILIZATION OF OFF-GIMBAL ELECTRO-OPTICAL PASSIVE AND ACTIVE SENSORS, assigned to the assignee of the present invention and herein incorporated by reference. The sensor suite of the above-referenced patent application requires plural diode laser reference sources. The sensor suite 70 of the present invention eliminates the plural reference sources in favor of the single boresight multi-source 12. Use of the efficient boresight multi-source 12 for boresighting enables a simplified optical path and continuous direct boresighting of the two imaging sensors 88 and 92.

The sensor suite 70 is mounted on the outer roll gimbal 74 and a pod aft structure 76. The afocal telescope 14, the boresight multi-source 12 and the first beam splitter 20 are mounted on the inner yaw gimbal 78, which is mounted on an intermediate pitch gimbal 80, which is mounted on the roll gimbal 74. The first mirror 16 is mounted on the pitch gimbal 80 off the yaw gimbal 78. The second mirror 56, the second beam splitter 54, a third beam splitter 82, an actuated alignment mirror 84, a servo alignment processor 86, a CCD receiver 88, a video processor 90, and an infrared receiver 92 are mounted directly on the roll gimbal 74. The pod aft 76 is adjacent to the roll gimbal 74. A fourth beam splitter 96, a laser boresight receiver 94, and the laser transceiver 58 are mounted on the pod aft structure 76.

In operation, the efficient boresight multi-source 12 is physically aligned relative to the optical axis of the afocal telescope 14, via methods known in the art. The relative alignment is maintained since the boresight multi-source 12 and the afocal telescope 14 are mounted on the same inner gimbal 78. Similarly, the first multi-spectral beam splitter 20 is physically aligned with respect to the optical axis of the afocal telescope 14 via alignment methods known in the art. The boresight multi-source 12 emits a uniform multi-spectral reference beam (multi-beam) 98 at an angle such that upon reflection off the first beamsplitter 20 it is co-aligned with the optical axis of the afocal telescope 14.

The multi-beam 98 contains an infrared component 100, a visible component 102, and an optical component 104 within the passbands of the infrared receiver 92, the CCD receiver 88, and the laser boresight receiver 94, respectively. The optical component 104 may be at a near-infrared wavelength, which is between the infrared component 100 and the visible component 102. The multi-beam 98 reflects off the first mirror 16 and the second mirror 56 to the second beam splitter 54 in a path coincident with the path of thermal energy 26 and visible energy 34 emanating from the scene 18. The second beam splitter 54 transmits the infrared component 100 of the multi-beam 98 to the infrared receiver 92. The infrared component 100 creates a reference spot on the surface of the infrared receiver 92 corresponding to the desired aimpoint position within the infrared image formed by the infrared receiver 92 via the infrared energy 26 from the scene 18.

The second multi-spectral beam splitter 54 reflects the visible reference beam component 102 and the optical reference beam component 104 to the third beam splitter 82. The third beam splitter 82 reflects the visible reference beam component 102 to the CCD receiver 88, thereby creating a reference spot on the focal surface of the CCD receiver 88. The reference spot coincides with the desired aimpoint position within the visible image formed by the CCD receiver 88 via the visible energy 34 from the scene 18.

The video processor 90 runs software and/or hardware algorithms known in the art for aligning the fiducial aimpoint position within the infrared and visible images from the infrared receiver 92 and the CCD receiver 88, about their respective reference spots. The video processor 90 may then send aligned video output to a monitor, automatic fire control system, chemical analysis system, and so on (not shown).

The third beam splitter 82 transmits the optical reference beam component 104 to the actuated alignment mirror 84, which reflects the beam component 104 to the fourth beam splitter 96, which reflects the beam component 104 to the laser boresight receiver 94. The optical reference beam component 104 creates a reference spot on the detector surface (not shown) of the laser boresight receiver 94. The detector surface of the laser boresight receiver 94 may be a two-dimensional photodetector array, a quad-cell detector array or a photopot sensitive to the wavelength of the optical reference beam component 104.

The laser boresight receiver 94 is rigidly mounted to the same pod aft structure 76 as the laser transceiver 58 and the fourth beam splitter 96. The laser transceiver beam 60 is physically boresighted to the optical axis of the laser boresight receiver 94 in a factory alignment process by manually adjusting the angular position (tip/tilt) of the fourth beam splitter 96. When the optical reference beam component 104 becomes misaligned with the rangefinder or targeting laser beam 60, the reference spot moves off of a predetermined desired location on the surface of the laser boresight receiver 94. The difference between the location of the reference spot on the surface of the laser boresight receiver 94 and the desired location of the reference spot represents an alignment error. This error is encoded as an error signal via hardware or software (not shown) associated with the boresight receiver 94. The error signal is forwarded to the auto-alignment servo processor 86.

The auto-alignment processor 86 runs control algorithms, which may be developed by one skilled in the art with access to the present teachings, to generate steering signals to control the angle of the actuated alignment mirror 84 to cancel the error. This aligns the transmit laser beam 60 with the second optical reference component 104. Consequently, the transmit laser beam 60 will be aligned with the multi-spectral reference source beam 98, which is aligned with the optical axis of the afocal telescope 14. Therefore, the transmit laser beam 60 will be aligned with the optical axis of the afocal telescope 14 to which all other sensors are aligned.

Figure 4:
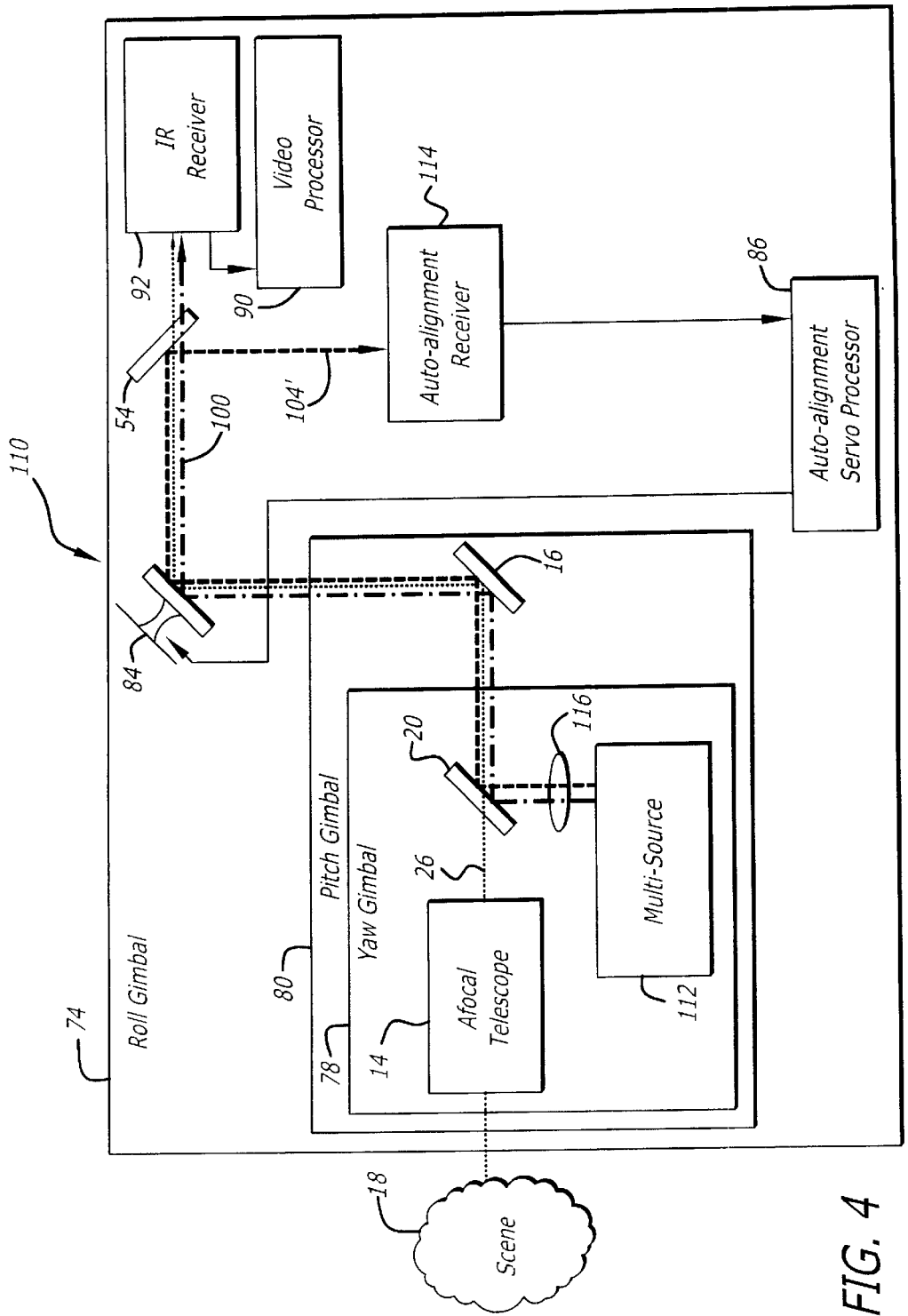
FIG. 4 is a diagram of a third sensor suite constructed in accordance with the teachings of the present invention and employing a multi-source that transmits a multi-spectral reference beam (multi-beam) for continuous automatic direct boresighting of the infrared receiver and continuous wide-bandwidth auto-alignment via the auto-alignment receiver.

FIG. 4 is a diagram of a third sensor suite 110 constructed in accordance with the teachings of the present invention and employing a multi-source 112 that transmits a multi-spectral reference beam (multi-beam) 16 for continuous automatic direct boresighting of the IR receiver 92 and continuous wide-bandwidth auto-alignment via the auto-alignment receiver 114. Continuous direct boresighting of the IR receiver 92 eliminates the long-term misalignment errors caused by mount interface creep, differential thermal expansion, and plastic deformation of structures. Since the response time for direct boresighting is limited by the low sensor frame rate and the video processor latency, often certain remaining high-frequency errors must also be corrected. Any remaining high frequency dynamic errors, such as errors associated with structural compliance under shock and vibration loads, are corrected via continuous auto-alignment via a high-speed, high-throughput, real-time auto-alignment receiver 114 and corresponding auto-alignment servo processor 86.

The third sensor suite 110 includes the yaw gimbal 78, which is mounted on the pitch gimbal 80, which is mounted on the roll gimbal 74. The afocal telescope 14, the first beam splitter 20, the multi-source 112, and the first mirror 16 are mounted and oriented on the yaw gimbal 78 and the pitch gimbal 80 in a similar orientation as the corresponding components 14, 20, 12, and 16 of FIG. 2, respectively. The actuated alignment mirror 84, the auto-alignment servo processor 86, the infrared receiver 92, the video processor 90, the third beam splitter 54, and an auto-alignment receiver 114 are mounted on the roll gimbal 74 off of the inner and outer gimbals 78 and 80, respectively. The auto-alignment servo processor 86 is connected to the auto-alignment receiver 114 and to the actuated alignment mirror 84. The angle of the actuated alignment mirror 84 is controllable via control signals received from the auto-alignment servo processor 86.

In operation, the multi-beam 116 contains an infrared component 100 and an optical component 104' within the passbands of the infrared receiver 92 and the auto-alignment receiver 114, respectively. The optical component 104' may be at a near-infrared wavelength.

The multi-beam 116 reflects off the first beam splitter 20 in a direction coincident with the optical axis of the afocal telescope 14. The optical axis of the afocal telescope 14 is coincident with infrared energy 26 emanating from the scene 18. The reflected multi-beam 116 then reflects off the first mirror 16 on the pitch gimbal 80 to the actuated alignment mirror 84. The multi-beam 116 then reflects off the actuated alignment mirror 84 to the second beam splitter 54. The second beam splitter 54 transmits the infrared component 100 of the multi-beam 116 to the infrared receiver 92 along with the infrared energy 26 emanating from the scene 18. The infrared component 100 creates a reference spot on the focal surface of the infrared receiver 92 corresponding to the desired aimpoint position within the infrared image. The video processor 90 runs software and/or hardware algorithms for aligning the fiducial aimpoint position within the infrared image from the infrared receiver 92 about the reference spot, thereby effecting continuous automatic direct boresighting of the IR receiver 92 to the optical axis of the afocal telescope 14.

The second beam splitter 54 reflects the optical component 104' of the multi-beam 116 to the auto-alignment receiver 114 thereby creating a reference spot on the surface of the autoalignment receiver 114. The difference between the location of the reference spot on the surface of the auto-alignment receiver 114 and the preferred location of the reference spot represents an alignment error. The alignment error is converted to an error signal that is transferred to the auto-alignment servo processor 86. The auto-alignment servo processor 86 then generates mirror-steering control signals. The mirror-steering control signals are sent to the actuated alignment mirror 84 and control the angle of the actuated alignment mirror 84 to cancel the error signal, thereby effecting continuous wide-bandwidth auto-alignment of the IR receiver 92 to the optical axis of the afocal telescope 14.

Systems and methods for implementing control loops for canceling error signals are known in the art. Consequently, one skilled in the art with access to the present teachings may readily implement necessary control algorithms running on the auto-alignment servo processor 86 without undue experimentation.

The multi-source 112 is optimized for third sensor suite 70 and includes two emitting structures implemented on a common substrate, as discussed more fully below. The first emitting structure may be a QCL with plural laser emitters and the second emitting structure may be a conventional bipolar diode laser implemented on a common substrate as discussed more fully below. The QCL first emitting structure may provide either a single wavelength or multiple wavelengths corresponding to a portion of the passband of the infrared receiver 92. The conventional bipolar diode laser may provide a wavelength that is outside the passband of the imagine sensor 92 but within the passband of the separate auto-alignment receiver 114, which is rigidly mounted to the optical bench (not shown) of the associated imaging sensor 92. The common boresight source 112, so configured, allows periodic absolute boresighting of the aimpoint of the imaging sensor 92. Continuous, wide-bandwidth auto-alignment of the sensor 92 with the boresight reference line-of-sight is achieved via the separate auto-alignment receiver 114.

Figure 5:
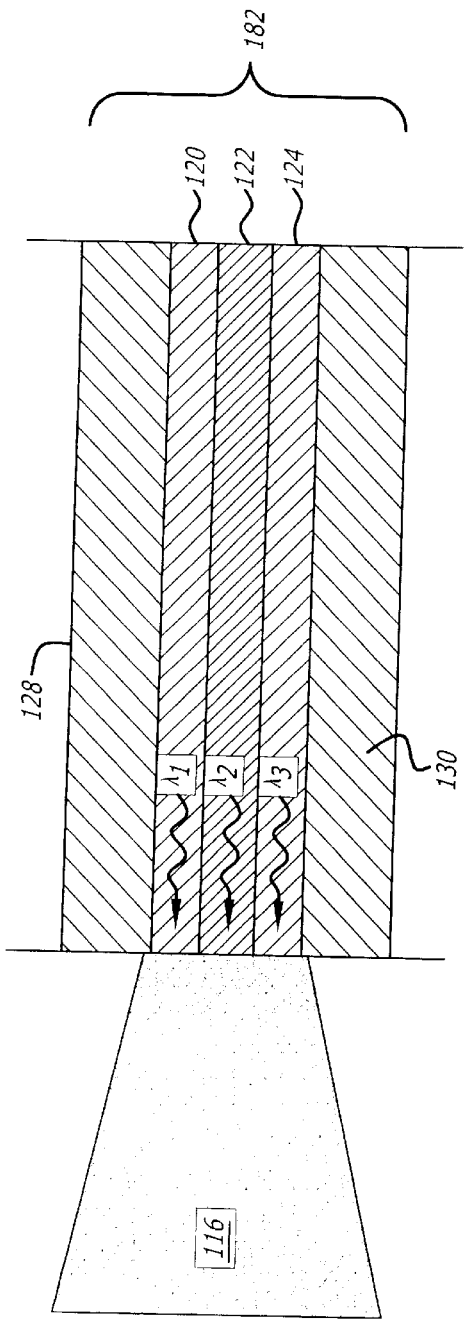
FIG. 5 is a diagram of a preferred embodiment of either the first or second emitting structure portions of the multi-source of FIG. 1, in which the emitting structure is composed of multiple QCL emitters in a common waveguide cavity with non-identical multi-layer repeat units.

FIG. 5 is a diagram of a preferred embodiment of the first emitting structure 182 of FIG. 1. Those skilled in the art will appreciate that the emitting structure 182 may be employed for the second emitting structure 186 of FIG. 1 without departing from the scope and spirit of the present invention.

The first emitting structure 182 includes multiple QCL emitters 120–124 in a common waveguide cavity. The QCL emitters 120, 122, and 124 are non-identical multi-layer repeat units.

Multiple QCL repeat units (emitters) within a common waveguide region are generally preferred due to the low output of each repeat unit. The structure and theory of operation of a QCL repeat unit is disclosed in U.S. Pat. No. 6,023,482, entitled ARTICLE COMPRISING A STRAIN-COMPENSATED QC LASER, herein incorporated by reference. Additional references include, for example, U.S. Pat. Nos. 5,457,709, 5,509,025, and 5,570,386; J. Faist et al., Applied Physics Letters, Vol. 68, pp. 3680–3682 (1996); F. Capasso et al, IEEE Journal on Selected Topics in Quantum Electronics, Vol. 6, No. 6 pp. 931–947 (2000); and C. Gmachl et al, IEEE Journal on Selected Topics in Quantum Electronics, Vol. 5, No. 3 pp. 808–816 (1999) all incorporated herein by reference.

The emitting structure 182 is a unipolar semiconductor structure having cladding layers 128, 130 on either side of a core region of higher refractive index thereby forming an optical waveguide therein. The cladding lasers 128, 130 may be designed for anomolous dispersion wherein the lasing frequency is close to the plasma frequency of the cladding layer, which advantageously provides a near-unity refractive index for good waveguide confinement and low optical absorption. The core region includes two or more repeat units 120–124. Each repeat unit typically includes an active region where interminiband transition lasing occurs, and an adjacent relaxation or carrier injection region, which facilitates carrier transport from the lower energy state of one active region to the higher energy state of the next active region. A single carrier traversing the QCL emitting structure 182, therefore, participates in multiple lasing processes, emitting one photon in each successive active region. The intersubband transitions facilitate use of wide-energy gap materials for infrared emission without intrinsic energy-gap-dependent losses from processes such as the Auger recombination or thermally induced free carrier absorption. The emission wavelength is determined by the composition of the superlattice structure and the thickness of the quantum wells within the active region in accordance with known design principles.

One or more of the repeat units 120–124 within the incentive emitting structure 182 is configured with a different superlattice composition and or a different quantum well thickness, such that the emission wavelength is different from the other repeat unit(s). The selection of superlattice composition, as well as the alternating barrier layer and quantum well layer thickness, must be such that the strains between alternating layers with different lattice constants substantially cancel across the repeat unit. The layer thickness must also be less than the critical thickness for stress-induced defect formation.

The exemplary QCL emitting structure 182 of FIG. 5 includes a first repeat unit 120, a second repeat unit 122, and a third repeat unit 124. The superlattice composition and/or the quantum well thickness within the respective active regions are varied via precise manufacturing techniques, such as Molecular Beam Epitaxy (MBE), which are well known in the art, to generate a portion of electromagnetic energy 116 with different wavelength components, $\lambda_1$, $\lambda_2$, and $\lambda_3$. The wavelength difference so created is of sufficient magnitude to average the interference speckle, thereby resulting in a uniform portion of electromagnetic radiation 116 of the multi-beam. The repeat units 120–124 are cascaded and sandwiched by common waveguide cladding layers 128, 130 to ensure planar confinement of the spatially-overlapping cavity modes corresponding to different wavelength components, $\lambda_1$, $\lambda_2$, and $\lambda_3$.

With reference to FIG. 1 and FIG. 5, the QCL emitting region 182 is disposed as shown in FIG. 1 with respect to the other multi-source 12 structures. The power source 134 of FIG. 1 provides proper voltage and polarity to bias the QCL emitting structure 182. Heat generated in the lasing and transport process is conducted through the source 12 from the QCL emitting structure 182 to the heatsink 118. A controller 138 selectively regulates the power source 134, such as by turning the power source 134 on and off at predetermined times, or in response to additional input (not shown), such as an on/off switch. The QCL 112 may be operated in different modes, such as continuous mode or pulsed mode, which is determined via the controller 138, which selectively controls the porter source 134 according to the operational mode of the QCL 112.

The exact choices for the center wavelengths $\lambda_1$, $\lambda_2$, and $\lambda_3$ are application-specific and may be determined by one skilled in the art to meet the needs of a given application. In the present specific embodiment, the wavelengths $\lambda_1$, $\lambda_2$, and $\lambda_3$ are chosen, such that when they are combined via the combining optics 148 of FIG. 1, interference phenomena that would otherwise cause a spatially and temporally non-uniform source beam, average, yielding the uniform source beam 116. Note that all of the QCL repeat units 120–124 share a common waveguide cavity, therefore the laser radiation does not emanate from individual layers but fills the entire region between the cladding layers 128 and 130.

For an exemplary mid-infrared QCW repeat unit operating at a wavelength of 3 micrometers, the superlattice layers may alternate between InGaAs quantum wells and InAlAs barrier layers, grown via MBE on an InP substrate, which may also serve as a cladding layer. The superlattice is lattice matched to the substrate. Certain layers may be doped with Si. The layer thickness may vary between 1 and 5 nanometers according to specific design rules as taught in, for example U.S. Pat. No. 6,023,482 referenced previously. QCL structures using other group III–V semiconductor material systems have also been reported. For example, a high reliability, low-loss QCL configuration based on the AlGaAs/GaAs material system is described by C. Sitori, et al., "Low-Loss Al-free Waveguides for Unipolar Semiconductor Lasers." Applied Physics Letters, Vol. 75, No. 25, pp. 3911–3913. December 1999. Also, Lucent Technologies is presently investigating QCL configurations based on the AlGaN/GaN material system for near-infrared operation at 1.55 micrometers. It should be appreciated that QCL structures based on other semiconductor material systems may be used without departing from the spirit and scope of this invention.

Employing the QCL repeat units 120–124 with sufficiently different superlattice compositions and/or layer thickness ensures that the emitted laser modes are at different wavelengths, which facilitates good spatial and temporal interference averaging without the need for independent, isolated laser cavities. The design of the emitting structure 182 provides spectral diversity, which is facilitated by the fact that the superlattice composition and layer thickness of the repeat units 120–124 can be precisely controlled. Furthermore, the center wavelengths $\lambda_1$, $\lambda_2$, and $\lambda_3$ of adjacent repeat units 120–124 can be separated sufficiently to prevent overlap of the laser gain curves, which ensures that the lasing modes within the common cavity remain uncoupled.

QCL's as described above are wide-bandgap room-temperature semiconductor devices, which can cover an extremely wide wavelength region between 3.5 and 24 micrometers, with the possibility of shorter and longer wavelength operation. Fabricating QCL's with multiple repeat units increases the photon yield per carrier and thereby affords high power output from a single emitting structure. QCL's have been disclosed with as many as 75 repeat units, with 25 being typical and average output powers on the order of 1 watt have been achieved. The available semiconductor material systems used to fabricate QCL's are more mature than the lead-salt and other systems required for conventional laser diode sources operating in the mid-IR and do not require low temperature cooling to function efficiently. The high operating temperature of the QCL allows effective operation at room temperature and obviates the need for expensive cryogenic coolers.

The QCL emitting structure 182 of the present invention may emit electromagnetic energy at multiple wavelengths within the passband of a sensor by varying the superlattice composition and quantum well layer thickness within each repeat unit 120–124. Successful demonstration of heterogeneous cascades, wherein different QCL repeat units were optimized to operate at different infrared wavelengths for differential absorption LIDAR and other applications, has been reported by Lucent Technologies, see C. Gmachl et al, Optics & Photonics News, p. 24, (December 2001). One such structure used a heterogeneous cascade containing two substacks and emitted simultaneously at 5.2 and 8.0 micrometers with low temperature performance that was comparable to the performance of the individual homogeneous stack lasers, see C. Gmachl et al, Applied Physics Letters, Vol. 79, No. 5, pp 572–574 (2001). Another structure used a heterogeneous cascade wherein the repeat unit layers altertnated between two non-identical cofigurations in an interdigitated arrangement. To the best of our knowledge, there is nothing in the prior art that teaches or suggests a QCL with non-identical repeat units so constructed to ensure the temporal and spatial uniformity of the source.

Generally, the materials and methods employed to construct QCL's are known in the art. Consequently, with access to the present teachings and prior art references, one skilled in the art could construct the multi-source with QCL emitting structure 182 without undue experimentation.

Figure 6:
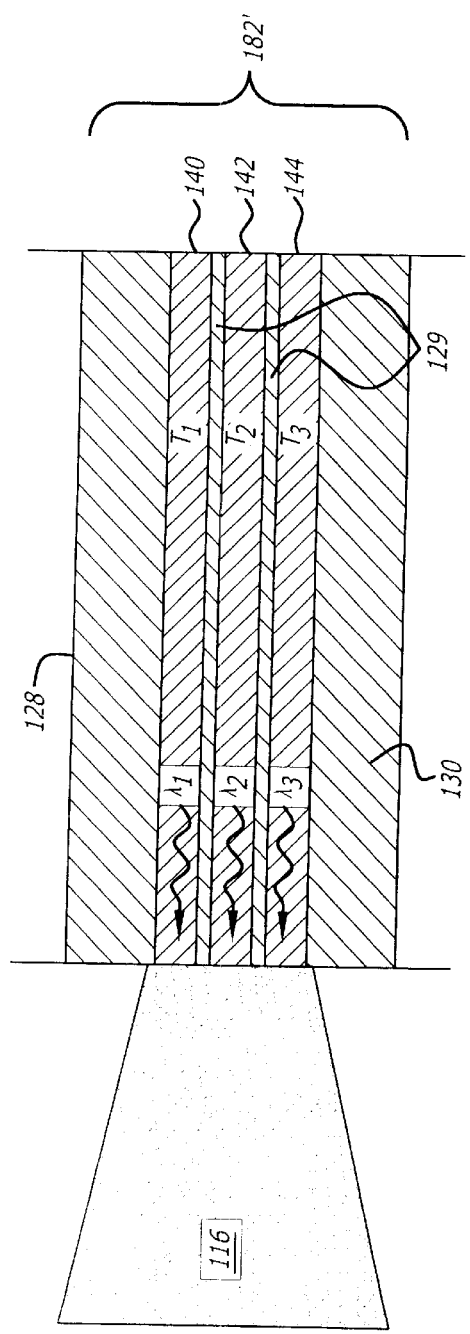
FIG. 6 is a diagram of a first alternative embodiment of either the first or second emitting structure portions of the multi-source of FIG. 1, in which the emitting structure is composed of multiple identical QCL core regions but operating at different temperatures.

FIG. 6 is a diagram of a first alternative embodiment 182' or the first emitting structure 182 of the multi-source 12 of FIG. 1. Those skilled in the art will appreciate that the emitting structure 182' may be employed as the second emitting structure 186 of FIG. 1 without departing from the scope and spirit of the present invention. The emitting structure 182' of FIG. 6 includes multiple identical QCL core regions 140–144 but operating at different temperatures. The identical core regions 140–144 generate infrared radiation 116 within a narrow waveband corresponding to a portion of the passband of a sensor (see 22 and 36 of FIG. 2) within the sensor suite (see 10 of FIG. 2).

The emitting structure 182' is a unipolar semiconductor structure having cladding layers 128, 129, and 130 on either side of two or more core regions 140–144 of higher refractive index, thereby forming optical waveguides within the core regions 140–144. In the present embodiment, each core region 140–144 includes one or more repeat units (not shown) as described in regard to FIG. 5 above (see repeat units 120–124 of FIG. 5). A temperature gradient normal to the planar layers of the semiconductor structure 182' is created such that the core regions 140–144 operate at different temperatures. The first core region 140 operates at a temperature $T_1$. The second core region 142 operates at a temperature $T_2$. And, the third core region 144 operates at a temperature $T_3$. The temperature gradient may be enhanced by increasing the resistivity and/or the thickness of the cladding layers 128–130 to increase the temperature difference across each layer. The temperature gradient can also be increased by adding additional heating and or thermal insulating lasers (not shown) between the core regions 128–130 without changing the optimum design of the cladding layers. This may be desirable to minimize the overall thickness of the emitting structure 182' and maintain the low refractive index of the cladding layers 128–130 for good mode confinement.

A temperature gradient normal to the planar layers 128, 140, 129, 142, 144, and 130 of the semiconductor structure 182' causes a change in both the physical length of the laser cavity and the refractive index of the semiconductor material comprising the core regions 140–144, thereby changing the optical path length within the active medium between the cleaved reflective end surfaces of the core regions 140–144. This change in optical path length results in a change in cavity mode wavelength ($\lambda_1$, $\lambda_2$, and $\lambda_3$) in accordance with engineering principles known in the art and described, for example, in W. Koechner, *Solid-State Laser Engineering Second Edition*, Springer-Verlag, Berlin, pp. 203–215 (1988).

The wavelength difference so created is of sufficient magnitude to average the interference speckle, thereby resulting in a uniform portion of electromagnetic radiation 116 of the multi-beam. The core regions 140–144 are cascaded and sandwiched by the waveguide cladding layers 128–130 to ensure planar confinement of the spatially-overlapping cavity modes corresponding to the repeat units within each core region 140–144.

The QCL emitting region 182' is disposed as shown in FIG. 1 (see 182 of FIG. 1) with respect to the other structures 181, 186, and 118 of the multi-source 12. The power source 134 of FIG. 1 provides proper voltage and polarity to bias the QCL emitting structure 182'. Heat generated in the lasing and transport process as well as any heat injected through additional heating structures (not shown) is conducted through the semiconductor structure from the QCL emitting structure 182' to the heatsink 118. A controller 138 selectively regulates the power source 134, such as by turning the power source 134 on and off at predetermined times, or in response to additional input (not shown), such as an on/off switch. The QCL emitting structure 182' may be operated in different modes, such as continuous mode or pulsed mode, which is determined via the controller 138, which selectively controls the power source 134 according to the operational mode of the QCL emitting structure 182'. The power source 134 may be connected to a resistive heater contact 136 that heats the semiconductor structure, enhancing the temperature gradient across the QCL emitting structure 182'.

Those skilled in the art will appreciate that resistive heater contacts, additional heating structures and insulating layers may be eliminated without departing from the spirit and scope of the present intention. In this case, natural thermal gradients, caused by spatially distributed heat generation within and finite thermal conductivity of the semiconductor material may be employed instead. The natural heat generation may be due to the quantum defect in the lasing process and other inelastic scattering processes within the QCL emitting structure 182'.

FIG. 7 is a diagram of a second alternative embodiment 182" of the first emitting structure portions 182 of the multi-source 12 of FIG. 1, which may also he employed to implement the second the emitting structure 186. The emitting structure 182" includes one or more identical QCL repeat units 154, wherein the laser cavities share a common distributed feedback diffraction grating cavity reflector 156. The grating-coupled identical repeat units 154 generate infrared radiation 116' on a single longitudinal mode corresponding to a portion of the passband of a sensor within the sensor suite (see FIG. 2, FIG. 3, or FIG. 4).

The emitting structure 182" is a unipolar semiconductor structure having cladding layers 152, 130 on either side of a core region (comprising the QCL repeat units 154) of higher refractive index thereby forming an optical waveguide therein. The core region includes one or more repeat units 154 as described in regard to FIG. 5 above. The core region is designed to minimize the temperature gradient, in contrast to the features of the first alternative embodiment of the first emitting structure 182' described above, which are designed to enhance the temperature gradient.

The distributed feedback grating 156 may be fabricated via chemical etching processes known in the art within the top surface of the cladding layer 152. A top layer 150 with different refractive index (different than the cladding layer 152) may be grown or deposited on the cladding layer 152. Alternatively, a metallization layer (not shown) may be deposited on the cladding layer 152 thereby periodically changing the characteristics of the optical waveguide region (comprising layers 154) along the length of the laser cavity and providing feedback via the process of Bragg diffraction. The exact number, position, and dimensions, and shape of gratings 152 are application-specific and may be determined by one skilled in the art to meet the needs of a given application. The use of distributed feedback features, such as Bragg diffraction gratings, to control the wavelength of conventional semiconductor bipolar semiconductor diode lasers is known in the art.

The structure and fabrication of both refractive index-coupled and gain-coupled distributed feedback lasers are described in U.S. Pat. No. 5,960,257, METHOD DISTRIBUTED FEEDBACK SEMICONDUCTOR LASER FOR FABRICATING, herein incorporated by reference. Two alternative structures may be used to implement gain-coupled distributed feedback lasers. In one structure, the diffraction grating 156 is fabricated within the active region (layers 154). In the other structure, the diffraction grating 156 includes an absorptive layer. The period of the grating is on the order of the oscillation wavelength within the medium and can be designed by one normally skilled in the art using known engineering principles to achieve a desired oscillation wavelength. The structure of a QCL with a Bragg grating disposed within a confinement region is disclosed in U.S. Pat. No. 6,023,482, referenced above.

The gratings 152 may facilitate establishing a well-defined single emitted wavelength, which is tunable by temperature. By tailoring the composition of the superlattice, thickness of the quantum wells, and period of the diffraction gratings 156, wide ranges within the mid-infrared and long wavelength infrared wavebands are obtainable. Simultaneous single-mode emission at two or more diverse wavelengths may be achieved by using heterogeneous cascades in conjunction with two or more grating regions with grating periods optimized for said diverse wavelengths, as demonstrated and practiced by Lucent Technologies.

Single mode operation of the QCL emitting structure 182" using distributed feedback Bragg gratings 156 or multi-line incoherence of the multiple repeat units of the QCL emitting structures 182 and 182' will avoid speckle-related source nonuniformity problems normally associated with boresight sources. The narrow band output in each spectral band will allow more efficient coupling of the light into the respective sensors (see 22 and 36 of FIGS. 2, 92, 88 and 94 of FIGS. 3 and 92 and 114 of FIG. 4) with properly tailored coatings.

FIG. 8 is a diagram of an alternative embodiment 186' of the second emitting structure 186 of the multi-source 12 of FIG. 1. The emitting structure 186' includes a conventional bipolar junction semiconductor diode laser active region 168. The active layer 168 may be implemented as a strained-laser multiple quantum well double-heterostructrure junction structure in which the wavelength of emitted radiation 188' depends primarily on the bandgap energy of the semiconductor material that is used. Tailoring the wavelength, therefore, requires selecting a semiconductor material system with the desired bandgap energy. Phase diagrams for a large variety of group III–V semiconductor material systems are readily available in the literature, allowing one skilled in the art to select one or more mature material systems to achieve a wide range of operating wavelengths from approximately 0.6 to 3 micrometers. Longer wavelength systems require low temperature operation to suppress competing processes, such as Auger recombination, as discussed earlier. The structure may include gain-guided and/or index-guided stripe geometries to laterally confine the charge carriers and laser light, respectively, to improve efficiency and produce a narrow beam, as desired for the specific reference source application. The active layer 168 is sandwiched by waveguide cladding layers 166, 170 to ensure planar confinement of laser light. The structure is fabricated using conventional semiconductor growth processes, such as MBE, and conventional lithographic techniques known in the art.

The semiconductor material systems typically used to fabricate conventional bipolar junction semiconductor diode lasers are the same as those used to fabricate QCL's, and both are based on lattice matching to substrates, such as InP, GaAs, and GaN. It is therefore anticipated that a wide variety of compatible hybrid bipolar and QCL structures may be used to address the combination of wavelengths desirable in a multi-source according to the teachings of the present invention.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover an and all such applications, modifications, and embodiments within the scope of the present invention.

What is claimed is:

1. An efficient boresight reference source comprising:
   first means for transmitting a first portion of electromagnetic energy within a first waveband, said first means including first laser emitting structure;
   second means transmitting a second portion of electromagnetic energy within a second waveband different than said first waveband, said second means including a second laser emitting structures, at least one of said first and second emitting structures including a Quantum Cascade Laser (QCL) emitting structure; and
   means for combining said first portion of electromagnetic energy and said second portion of electromagnetic energy to yield a uniform reference beam.

2. The source of claim 1 wherein said first and second wavebands correspond to wavebands of one or more sensors employing said boresight reference source, said wavebands including visible and/or infrared portions of the electromagnetic spectrum.

3. The source of claim 1 wherein said first and second wavebands are sufficiently different to avoid undesirable coupling between one or more laser cavities associated with said first and second emitting structures, respectively.

4. The source of claim 1 wherein said uniform reference beam is a collimated, co-aligned, and multi-spectral reference beam.

5. The source of claim 4 wherein said first emitting structure includes multiple QCL repeat units within a common waveguide region of said first emitting structure.

6. The source of claim 5 wherein said multiple QCL repeat units have sufficient properties to cause said multiple QCL repeat units to operate at different wavelengths within a passband of said one or more sensors to enhance uniformity of said uniform reference beam.

7. The source of claim 1 wherein said first and second emitting structures are oriented to cause automatic combining of said first and second portions of electromagnetic energy, respectively.

8. The source of claim 5 wherein said multiple QCL repeat units have different superlattice compositions and/or quantum well thickness, sufficient to cause said multiple QCL repeat units to operate at different wavelengths within a passband of said one or more sensors to enhance uniformity of said uniform reference beam.

9. The source of claim 5 including means for causing temperature differences between said QCL repeat units to create a thermal gradient across said first emitting structure sufficient to change optical path length within laser cavities of said QCL repeat units to shift wavelengths of resonant modes of each of said QCL repeat units within a passband of said one or more sensors to ensure uniformity of said uniform reference beam.

10. The source of claim 9 wherein said multiple QCL repeat units are identical repeat units operating at different temperatures to generate different center wavelengths within each waveband.

11. The source of claim 5 wherein said QCL emitting structure has mode coupling means so that lasing within all QCL repeat units occurs on a single longitudinal mode and at a single phase to ensure uniformity of said uniform reference beam.

12. The source of claim 11 wherein said mode coupling means includes one or more distributed feedback gratings sufficient to define the length of one or more resonator cavities.

13. The source of claim 1 wherein at least one of said first and second emitting structures is a bipolar junction laser diode emitting structure.

14. The source of claim 13 wherein said bipolar junction laser diode is cascaded with said first and/or second emitting structures, which are QCL emitting structures.

15. The source of claim 14 wherein said uniform reference beam includes at least two wavebands, one of said wavebands coinciding with a portion of a passband of an imaging sensor in an accompanying sensor suite, a different one of said wavebands coinciding with a portion of a passband of a separate boresight detector associated with said imaging sensor.

16. The source of claim 1 wherein said reference source is associated with a boresight system that includes first means for focusing electromagnetic energy within a first frequency band received from a scene and providing focused energy in response thereto; second means for sensing said focused energy; and third means for aligning said second means relative to said first means or vice versa via said efficient boresight reference source.

17. A space-efficient sensor suite comprising:
   first means for focusing electromagnetic energy within a first frequency band received from a scene and providing focused energy in response thereto;
   second means for sensing said focused energy; and
   third means for aligning said second means relative to said first means or vice versa via a boresight reference source having plural emitting structures, at least one of said emitting structures being a Quantum Cascade Laser (QCL).

18. The sensor suite of claim 17 wherein said plural emitting structures emit first and second beams that combine into a co-aligned uniform reference beam; wherein said first and second beams are characterized by first and second different frequency bands, respectively.

19. The sensor suite of claim 18 wherein said second means includes an infrared or visible sensor, and wherein said third means includes an auto-alignment processor, an actuated mirror, and a boresight receiver for aligning said focused energy with said second means based on a location of a spot on said boresight receiver created by said boresight reference beam.

20. A space-efficient sensor suite comprising:
   a transmitter for transmitting a beam of electromagnetic energy at a scene;
   a first sensor for detecting electromagnetic energy within a first frequency band emanating from said scene;
   a second sensor for detecting electromagnetic energy within a second frequency band emanating from said scene; and
   means for boresighting said first sensor and said second sensor to said transmit beam and said scene via a boresight reference source having plural emitting structures that emit reference electromagnetic energy within said first and second frequency bands, said boresight reference source including one or more quantum cascade laser emitting structures having plural QCL repeat units and/or one or more bipolar junction semiconductor laser emitting structures.

21. The sensor suite of claim 20 wherein said transmitter is a laser and said transmit beam of electromagnetic energy is a laser beam.

22. The sensor suite of claim 20 wherein said electromagnetic energy within said first and second frequency bands are infrared and visible energy, respectively.

23. The sensor suite of claim 20 wherein said means for boresighting includes means for aligning said reference electromagnetic energy to a telescope or line of sight of said sensor suite, and wherein said means for boresighting includes means for aligning a transmit laser to said telescope via said reference electromagnetic energy, a controllable mirror, and a laser boresight receiver.

24. The sensor suite of claim 20 wherein said transmitter, said first sensor, said second sensor, and/or said boresighting means are mounted on separate gimbal structures.

25. The sensor suite of claim 20 wherein said means for boresighting includes means for directing said reference electromagnetic energy to create a first reference spot on said first sensor and a second reference spot on said second sensor.

26. The sensor suite of claim 25 wherein said means for boresighting includes means for aligning a first image created by said first sensor with said afocal telescope via said first reference spot and aligning a second image created by said second sensor with said afocal telescope via said second reference spot.

27. The sensor suite of claim 26 wherein said means for aligning includes a video processor in communication with said first sensor and said second sensor, said video processor running hardware or software algorithms for centering said first and second images about said first and second reference spots, respectively.

28. A space-efficient sensor suite comprising:
   a transmit laser beam aimed at a scene;
   an infrared sensor positioned to sense infrared energy from said scene;
   a visible sensor positioned to receive visible energy from said scene; and
   a boresight reference source that emits both infrared and visible energy coincident or parallel with a portion of said transmit laser beam to provide a reference beam on said infrared sensor and said optical sensor to facilitate alignment of said infrared sensor and said optical sensor with energy received from said scene said boresight reference source including one or more quantum cascade laser emitting structures having plural QCL repeat units.

29. The sensor suite of claim 28 wherein said plural emitting structures have differing superlattice compositions and/or differing quantum well thickness to minimize nonuniformities in said reference beam.

30. The sensor suite of claim 28 including means for producing a temperature gradient across said emitting structures to cause said emitting structures to emit at different wavelengths sufficient to minimize nonuniformities in said reference beam.

31. A system for aligning a beam of electromagnetic energy relative to a desired path comprising:
   first means for determining an initial path of said beam of electromagnetic energy, said first means including a quantum cascade laser emitting a reference beam coincident with a first portion of said initial path;
   second means for measuring a difference between a second portion of said initial path and said desired path based on said reference beam and providing a signal in response thereto; and
   third means for canceling said difference in response to said signal, thereby aligning said beam path to said desired path or vice versa.

32. A method for providing efficient boresight reference source comprising the steps of:
   transmitting a first portion of electromagnetic energy;
   transmitting a second portion of electromagnetic energy, at least one of said first portion or said second portion being transmitted via a Quantum Cascade Laser (QCL) emitting structure; and
   combining said first portion of electromagnetic energy and said second portion of electromagnetic energy to yield a co-aligned uniform reference beam.

33. The method of claim 32 further including the step of employing said first portion of electromagnetic energy for long-term boresight updates of a sensor and employing said second portion of electromagnetic energy for continuous dynamic alignment of said sensor.

34. An efficient boresight reference source comprising:
   first means for transmitting a first portion of electromagnetic energy within a first waveband;
   second means transmitting a second portion of electromagnetic energy within a second waveband different than said first waveband, said first means including a first emitting structure and said second means including a second emitting structure, said first emitting structure including multiple QCL (Quantum Cascade Laser) repeat units within a common waveguide region of said first emitting structure, and
   means for combining said first portion of electromagnetic energy and said second portion of electromagnetic energy to yield a uniform reference beam.

35. The source of claim 34 wherein said multiple QCL repeat units have sufficient properties to cause said multiple QCL repeat units to operate at different wavelengths within a passband of said one or more sensors to enhance uniformity of said uniform reference beam.

36. The source of claim 34 wherein said multiple QCL repeat units have different superlattice compositions and/or quantum well thickness, sufficient to cause said multiple QCL repeat units to operate at different wavelengths within a passband of said one or more sensors to enhance uniformity of said uniform reference beam.

37. The source of claim 34 including means for causing temperature differences between said QCL repeat units to create a thermal gradient across said first emitting structure sufficient to change optical path length within laser cavities of said QCL repeat units to shift wavelengths of resonant modes of each of said QCL repeat units within a passband of said one or more sensors to ensure uniformity of said uniform reference beam.

38. The source of claim 34 wherein said multiple QCL repeat units are identical repeat units operating at different temperatures to generate different center wavelengths within each waveband.

39. The source of claim 34 wherein said QCL emitting structure has mode coupling means so that lasing within all QCL repeat units occurs on a single longitudinal mode and at a single phase to ensure uniformity of said uniform reference beam.

40. The source of claim 34 wherein said mode coupling means includes one or more distributed feedback gratings sufficient to define the length of one or more resonator cavities.

41. An efficient boresight reference source comprising:
first means for transmitting a first portion of electromagnetic energy within a first waveband, said first means including a first laser emitting structure;
second means transmitting a second portion of electromagnetic energy within a second waveband different than said first waveband, said second means including a second laser emitting structure, at least one of said first and second emitting structures being a bipolar junction laser diode emitting structure and said bipolar junction laser diode being cascaded with said first and/or second emitting structures, said first and/or second emitting structures being QCL (Quantum Cascade Laser) emitting structures; and
means for combining said first portion of electromagnetic energy and said second portion of electromagnetic energy to yield a uniform reference beam.

42. The source of claim 41 wherein said uniform reference beam includes at least two wavebands, one of said wavebands coinciding with a portion of a passband of an imaging sensor in an accompanying sensor suite, a different one of said wavebands coinciding with a portion of a passband of a separate boresight detector associated with said imaging sensor.

* * * * *